(12) United States Patent
Dubs et al.

(10) Patent No.: US 12,679,195 B2
(45) Date of Patent: Jul. 14, 2026

(54) HYBRID DRIVE TRAIN FOR A VEHICLE

(71) Applicant: Alpraaz AB, Ängelholm (SE)

(72) Inventors: Steve Dubs, Vejbystrand (SE);
Christian Von Koenigsegg, Vejbystrand
(SE)

(73) Assignee: Alpraaz AB, Ängelholm (SE)

( * ) Notice: Subject to any disclaimer, the term of this
patent is extended or adjusted under 35
U.S.C. 154(b) by 296 days.

(21) Appl. No.: 18/704,186

(22) PCT Filed: Oct. 26, 2022

(86) PCT No.: PCT/SE2022/050978
§ 371 (c)(1),
(2) Date: Apr. 24, 2024

(87) PCT Pub. No.: WO2023/075666
PCT Pub. Date: May 4, 2023

(65) Prior Publication Data
US 2026/0158899 A1 Jun. 11, 2026

(30) Foreign Application Priority Data
Oct. 29, 2021 (SE) ..................................... 2151339-5

(51) Int. Cl.
*B60K 6/48* (2007.10)
*B60K 6/387* (2007.10)
(Continued)

(52) U.S. Cl.
CPC ................ *B60K 6/48* (2013.01); *B60K 6/387*
(2013.01); *B60K 6/52* (2013.01); *B60W 10/02*
(2013.01);
(Continued)

(58) Field of Classification Search
CPC .................... B60K 17/02; B60K 17/34; B60K
17/348–352; B60K 6/48; B60K 6/387;
(Continued)

(56) References Cited

U.S. PATENT DOCUMENTS

| 8,506,439 | B2 | 8/2013 | Strasser et al. |
| 9,365,207 | B2 | 6/2016 | Severinsson et al. |
| (Continued) | | | |

FOREIGN PATENT DOCUMENTS

| CN | 111823854 A | 10/2020 |
| DE | 19655299 B4 | 2/2006 |
| DE | 102016100788 A1 | 7/2017 |

*Primary Examiner* — Lori Wu

(74) *Attorney, Agent, or Firm* — Shore IP Group, PLLC;
Howard J. Klein

(57) ABSTRACT

A hybrid drivetrain is operable for selective driving of first
wheels through a first drive shaft to which a first drive unit
is connectable, and second wheels through a second drive
shaft to which a second drive unit is connectable. A con-
nection clutch allows for selective connection between the
first and second drive units. A slip clutch assembly allows
selective connection between the second drive unit and the
second drive shaft. The slip clutch assembly may be a dual
clutch arrangement having two slip clutches respectively
located on either side of a bevel gear. The slip clutches are
controllable for allowing different rotational speeds of the
second wheels driven by the second drive shaft.

11 Claims, 4 Drawing Sheets

(51) Int. Cl.

| | |
|---|---|
| *B60K 6/52* | (2007.10) |
| *B60W 10/02* | (2006.01) |
| *B60W 10/08* | (2006.01) |
| *B60W 20/40* | (2016.01) |

(52) U.S. Cl.
CPC ............ *B60W 10/08* (2013.01); *B60W 20/40* (2013.01); *B60W 2710/021* (2013.01)

(58) Field of Classification Search
CPC ......... B60K 6/52; B60W 10/02; B60W 10/08; B60W 20/40; B60W 2710/021
See application file for complete search history.

(56) References Cited

U.S. PATENT DOCUMENTS

| | | |
|---|---|---|
| 2003/0162631 A1 | 8/2003 | Williams |
| 2010/0049390 A1 | 2/2010 | Supina et al. |
| 2016/0185216 A1 | 6/2016 | Clarke et al. |
| 2022/0017069 A1* | 1/2022 | Glück ...................... B60K 6/48 |
| 2022/0055475 A1* | 2/2022 | Hirosumi .............. B60W 10/02 |

* cited by examiner

HYBRID DRIVE TRAIN FOR A VEHICLE

CROSS-REFERENCE TO RELATED APPLICATIONS

This application is a national phase entry, under 35 U.S.C. 371, of International Application No. PCT/SE2022/050978, filed Oct. 26, 2022, the disclosure of which is incorporated herein by reference in its entirety. International Application No. PCT/SE2022/050978 claims priority from European Application No. 2151339-5, filed Oct. 29, 2021.

FIELD OF THE INVENTION

The present invention relates to a hybrid drivetrain for selective driving of wheels of first and second drive shafts of a vehicle, said drivetrain comprising first and second drive units, wherein the first drive unit is connected to the first drive shaft and wherein the second drive unit is connected to the second drive shaft.

PRIOR ART

Hybrid vehicles, i.e. vehicles that can be driven by either—or both of—a combustion engine and an electric motor powered by an on-board energy storage, e.g. a battery, a capacitor, a flywheel connected to a generator, a fuel cell or the like, are gaining popularity due to the freedom of choice concerning energizing the vehicle offered by hybrid systems.

Two types of hybrid vehicle are dominating the market: "Serial hybrids", where a combustion engine powers a generator, which charges an on-board battery and/or an electric motor driving the vehicle, and "parallel hybrids", wherein the electric motor works in parallel to the combustion engine. In most cases, it is possible to drive the vehicle in either pure electric mode, pure combustion engine mode or a mode combining electric mode and combustion engine mode. Generally speaking, "serial hybrids" have the advantage that the combustion engine can run on its best operating speed and load, whereas the parallel hybrids'biggest advantage is that transmission losses can be kept to a minimum. The disadvantages with serial hybrids are that it is not possible to recharge the on-board battery by connecting the combustion engine to the electric motor and use the electric motor as a generator (a serial hybrid uses a separate generator for producing the electric power needed to charge the on-board battery and power the electric motor) and that it is not possible to connect the combustion engine directly to the driving wheels of the vehicle. At least for common parallel hybrid vehicle configurations where the electric motor is positioned somewhere between the gearbox and the wheel axle powered by the combustion engine, a big disadvantage is that the electrical motor follows the engine speed of the combustion engine, although the optimum electric motor speeds are not equal to the optimum speed of a combustion engine.

US2010/049390 discloses a hybrid electric system for four-wheel drive vehicles, wherein an electric motor drives the front wheels and a combustion engine drives the rear wheels of the vehicle and a generator for charging an on-board battery and powering the electric motor. This system overcomes one of the parallel hybrid system's drawbacks in that the electric motor does not need to follow the combustion engine speed.

It is an object of the present invention to provide a hybrid system comprising a single electric motor and a single combustion engine and allowing for at least some of the following:

Selection between front wheel drive, rear wheel drive, four wheel drive and boosted two wheel drive, wherein the electric motor and the combustion both are used to provide power to the rear wheels or alternatively to the front wheels.

On-board charging of battery by connecting the electric motor to the combustion engine and using the electric motor as a generator.

Energy recovery during vehicle braking.

Starting the combustion engine by using the electric motor as a starter motor.

SUMMARY OF THE INVENTION

A first aspect of the present invention achieves the object above by a hybrid drivetrain comprising first and second drive units, wherein the first drive unit is connected to the first drive shaft, wherein the second drive unit is connected to the second drive shaft, and wherein a connection clutch is arranged for selective connection between the first and second drive units. A slip clutch assembly is provided for allowing selective connection between the second drive unit and the second drive shaft. This allows wheels of the second drive shaft to either rotate freely, be driven by the second drive unit or perform a regenerative brake function. The slip clutch assembly allowing for selective connection between the second drive unit and the second drive shaft is a dual clutch arrangement comprising two slip clutches located on both sides of a bevel gear, wherein said slip clutches are controllable for allowing different rotational speeds by a controlled slip of the wheels of the second drive shaft. By this arrangement, so-called torque vectoring, i.e. a precise apportionment of the torque applied to the wheels of the second drive shaft, can be achieved.

In order to be able to run the hybrid drive system in battery charging mode without driving the vehicle, a drive clutch may be provided for allowing selective connection between the first drive unit and the first drive shaft.

The first drive unit may be a combustion engine and the second drive unit may be an electric motor.

In order to get an optimum rotational speed of the first drive unit, a gearbox may connect the first drive unit and the first drive shaft.

The second drive unit may be directly connected to the second drive shaft without gear shift capabilities. In order to get good take-off capabilities, i.e. starting from vehicle standstill, a total gearing of the wheel size of the wheels of the second drive shaft and the second drive shaft's connection to the second drive unit may be such that the second drive unit will reach its maximum rotational speed at a vehicle velocity significantly lower than the vehicle's top speed.

In order not to overrev the second drive unit, the slip clutch assembly between the second drive unit and the second drive shaft may be adapted to be disconnected or disengaged as the vehicle approaches the vehicle speed at which the second drive unit approaches its maximum rotational speed.

A second aspect of the present invention is a vehicle, such as a car, comprising a hybrid drivetrain as set out above for the first aspect of the present invention. The first drive shaft may then typically be located at the rear of the vehicle, whereas the second drive shaft may be located at the front of the vehicle. The opposite configuration may be the case as an alternative.

A third aspect of the present invention is a method for controlling a hybrid drivetrain for selective driving of wheels of first and second drive shafts of a vehicle, the hybrid drivetrain comprising first and second drive units, wherein the first drive unit is connected to the first drive shaft and wherein the second drive unit is connected to the second drive shaft, a connection clutch for allowing selective connection between the first and second drive units, and a drive clutch for allowing selective connection between the first drive unit and the first drive shaft. The method comprises determining a desired driving mode from the following driving modes a. to g., and controlling energizing of the second drive unit and engagement and disengagement of the slip clutch assembly, the connection clutch and the drive clutch accordingly:

a. starter mode: energize the second drive unit, engage the connection clutch and disengage the slip clutch assembly and the drive clutch,
  b. four-wheel drive mode: energize the second drive unit, engage slip clutch assembly and drive clutch, disengage connection clutch,
  c. two-wheel boosted drive mode: energize second drive unit, disengage slip clutch assembly, engage connection clutch and drive clutch,
  d. two-wheel electric mode: energize second drive unit, engage slip clutch assembly, disengage drive clutch and connection clutch,
  e. two-wheel combustion engine driving mode: disengage slip clutch assembly and connection clutch, engage drive clutch,
  f. battery charging mode: engage connection clutch and control the second drive unit to function as a generator powered by the first drive unit, and
  g. regenerative braking mode: engage slip clutch assembly, control the second drive unit to function as a generator and store the electric power produced by the second drive unit in the on-board battery.

The hybrid drivetrain controlled by the method according to the third aspect may advantageously be the hybrid drivetrain as defined above for the first aspect of the present invention.

A fourth aspect of the present invention is a control arrangement for a hybrid drivetrain of a vehicle, the control arrangement being configured for performing the method according to the third aspect of the present invention.

The first drive shaft as referred to in this document may be a rear wheel axle of a vehicle, whereas the second drive shaft may be the front wheel axle of the vehicle. Alternatively, the first drive shaft may be a front wheel axle of a vehicle, whereas the second drive shaft may be the rear wheel axle of the vehicle.

BRIEF DESCRIPTION OF THE DRAWINGS

In the following, the invention will be described by reference to preferred embodiments of the invention, which are shown in the appended figures, wherein.

DESCRIPTION OF EMBODIMENTS

Figure 1:
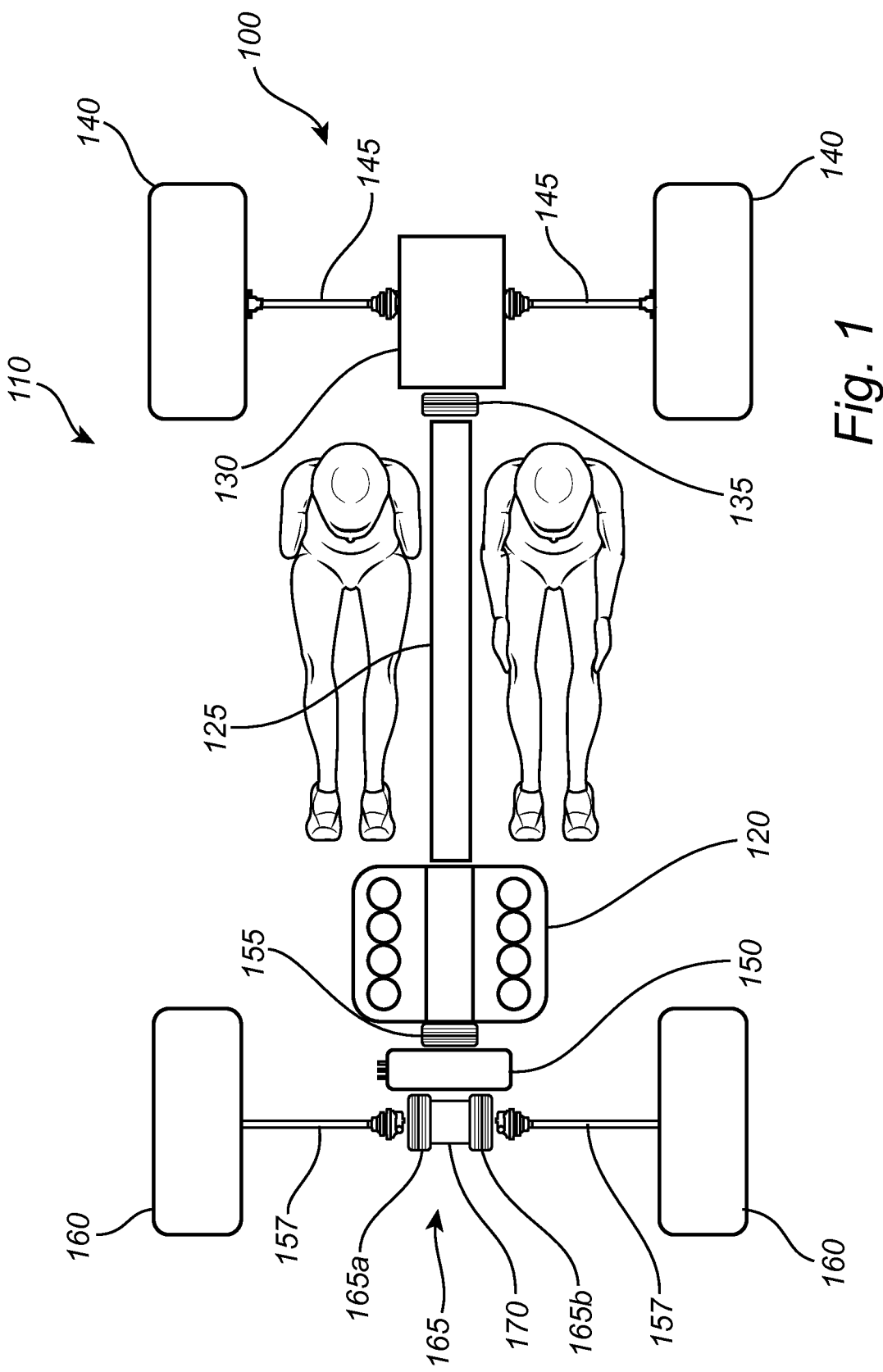
FIG. 1 is a schematic view of a hybrid drivetrain according to a first embodiment of the invention.

In FIG. 1, a hybrid drivetrain 100 according to a first embodiment of the present invention comprised in a four wheeled vehicle 110, such as a car, is shown schematically. The hybrid drivetrain 100 comprises a combustion engine 120 connected by a cardan- or propshaft 125 to a torque/rpm converting unit 130 provided with a drive clutch 135, allowing for the combustion engine 120 to be selectively connected or disconnected from the gearbox 130, a suitable numbers of gears and a differential (not shown) allowing two driven wheels 140 of a first drive shaft 145 to rotate with different rotational speeds, wherein the sum of the rotational speeds of the driven wheels 140 is constant for a given engine speed and gear ratio. In order to allow so-called "sailing", i.e. a drive mode where the vehicle 110 continues its motion without supplying driving force to the wheels and without engine braking, the differential may be provided with a free-wheeling function. In some embodiments, the drive clutch 135 is a lockup clutch in a torque converter. In the embodiments disclosed in FIGS. 1 to 3, the torque/rpm converting unit 130 is a gearbox. Accordingly, the torque/rpm converting unit 130 will be referred to as gearbox 130 in the following. In other embodiments, the torque/rpm converting unit 130 may comprise a differential gear arrangement or an arrangement with a pair of slip clutches on opposite sides of a bevel gear.

An electric motor 150 is connected to a second drive shaft 157, connecting two wheels 160, by a bevel gear 170. In order to selectively allow for different rotational speeds of the two wheels 160, a slip clutch assembly 165 comprising two slip clutches 165a, 165b is provided, wherein the slip clutches 165a, 165b can control a torque supplied to each of the wheels 160 and hence allow for different rotational speeds of the wheels 160 by slipping. The slip clutch assembly can be fully or partly engaged by engaging either or both of the slip clutches 165a, 165b. Hereinafter, the term "engaged" will be used both for full and partial engagement of the slip clutch assembly 165. The combustion engine 120 is also connected to the electric motor 150 via a connection clutch 155 situated between the electric motor 150 and the combustion engine 120, that can selectively connect and disconnect the combustion engine 120 and the electric motor 150. In some embodiments, the connection clutch 155 is a lockup clutch in a torque converter. The motor 150 is preferably a combined motor and generator, such that an on-board battery (not shown) can be used both to energize the motor 150 and absorb (store) energy if the motor 150 is controlled to function as a generator. It should be understood that the battery can be any device capable of storing and releasing electric energy, e.g. a chemical battery, a flywheel connected to a motor/generator, a capacitor, a tank containing pressurized air that can be charged by an air compressor and discharged via an air turbine connected to a generator or the like. In all of the embodiments of this invention, the term "battery" is meant to cover all such varieties of devices being able to be charged and discharged of electrical energy, or of energy that can be converted to electric energy. In effect, the term "battery" as referred to in this document shall be construed as being no more limited than a rechargeable energy storage system (RESS).

Figure 4:
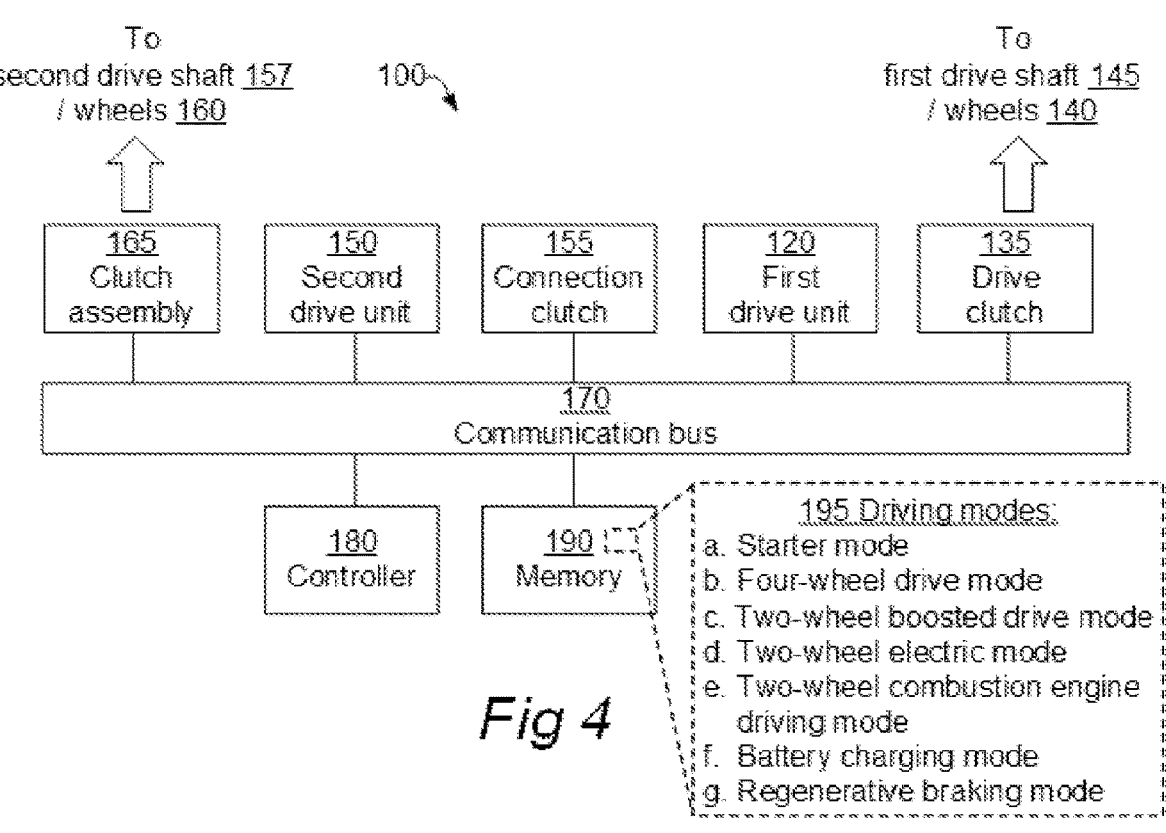
FIG. 4 is a schematic block diagram of major components of the hybrid drivetrain as well as a control arrangement thereof.

The above arrangement of the engine 120, the electric motor 150, the connection clutch 155 and the slip clutch assembly 165 gives the possibility to run the hybrid powertrain 100 in several different driving modes (for further details, please refer to the description of FIGS. 4 and 5 in a later section of this document):

Starter mode: in order to start the engine 120 by using the motor 150 as a starter motor, the connection clutch 155 is engaged, while the slip clutch assembly 165 and the drive clutch 135 of the gearbox 130 are disengaged. This allows for the engine 120 to be rotated by the motor 150 without driving any of the wheels 160 nor the driven wheels 140.

Four-wheel drive mode: slip clutch assembly 165 engaged, connection clutch 155 disengaged and drive clutch 135 engaged. In the four wheel drive mode, the electric motor 150 will drive at least one of the wheels 160, and the engine 120 will drive the drive wheels 140 via the gearbox 130.

Two-wheel boosted drive mode: slip clutch assembly 165 disengaged, connection clutch 155 and drive clutch 135 engaged. In this mode, the electric motor 150 and the combustion engine 120 cooperate to provide power to the gearbox 130 and hence the drive wheels 140 of the first drive shaft 145.

Two-wheel electric mode: slip clutch assembly 165 engaged, connection clutch 155 and drive clutch 135 disengaged. This mode allows the wheels 160 to be driven by the electrical motor 150 only, while the combustion engine 120 is idling or shut off.

Two-wheel combustion engine driving mode: slip clutch assembly 165 and connection clutch 155 disengaged, drive clutch 135 engaged. This allows for driving the vehicle with the combustion engine 120 only.

Battery charging mode: as soon as the combustion engine 120 is running and the connection clutch 155 is engaged, it is possible to run the hybrid drive train 100 in battery (not shown) charging mode by controlling the electrical motor 150 to function as a generator. If battery charging mode is used while driving the vehicle, more power than needed for the driving must be provided by the combustion engine 120.

Regenerative braking mode: regenerative braking, i.e. braking the vehicle while storing the braking energy in the battery (not shown) can be utilized by engaging the slip clutch assembly 165 and controlling the electrical motor 150 to function as a generator transferring the electric power generated by the braking to the on-board battery. Except for providing for battery charging, generative braking is beneficial in that it results in less wear of brake discs and brake pads, hence resulting in less brake pad dust polluting the environment.

It should be noted that in no driving mode disclosed above, all of the slip clutch assembly 165, the connection clutch 155 and the drive clutch 135 are engaged. In theory, there is one driving mode where all clutches could be engaged, namely the driving mode wherein the vehicle 110 is travelling on a straight road and wherein a total gear ratio of the gearbox 130 including its differential (not shown) multiplied by the circumference of the wheels 140 is identical to the gear ratio of the bevel gear 170 multiplied by the circumference of the wheels 160.

As mentioned above, it is sometimes-notably each time the vehicle 110 turns—necessary to allow for the wheels 160 and driven wheels 140 to rotate at different speeds. In sharp turns, all wheels of any four wheel vehicle shall have different rotational speeds in order to provide for minimal tyre wear and a smooth turn. The differential (not shown) of the gearbox 130 will allow for different rotational speeds of the driven wheels 140 and by controlling either or both of the slip clutches 165a, 165b to slip, differing rotational speeds of the wheels 160 can be obtained.

Figure 2:
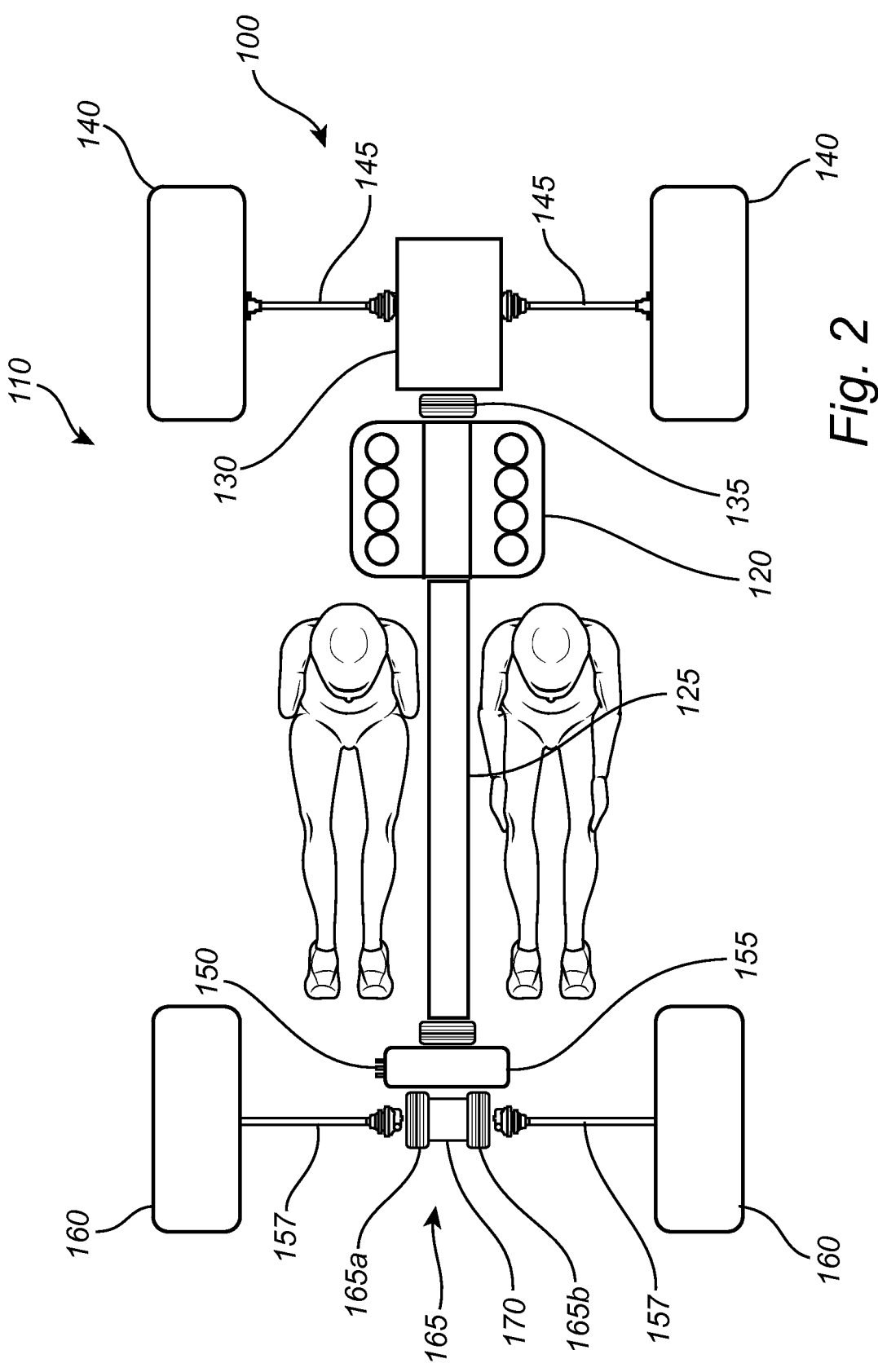
FIG. 2 is a schematic view of a hybrid drivetrain according to a second embodiment of the present invention.

In a second embodiment of the invention, shown in FIG. 2, the prop-shaft 125 is provided between the electrical motor 150 and the combustion engine 120 rather than between the combustion engine 130 and the gearbox 130. This embodiment of the invention is beneficial if the weight distribution of the vehicle 110 gains from the combustion engine 120 being situated close to the gearbox 130. In all other aspects, the embodiment shown in FIG. 2 is identical to the embodiment of FIG. 1—The connection clutch 155 is arranged to enable selective mechanical connection between the combustion engine 120 and the electric motor 150, the slip clutch assembly 165 can be connected and disconnected in order to allow for different driving modes and the drive clutch 135 can be used to connect and disconnect the combustion engine 120 from mechanical connection to the wheels 140.

Figure 3:
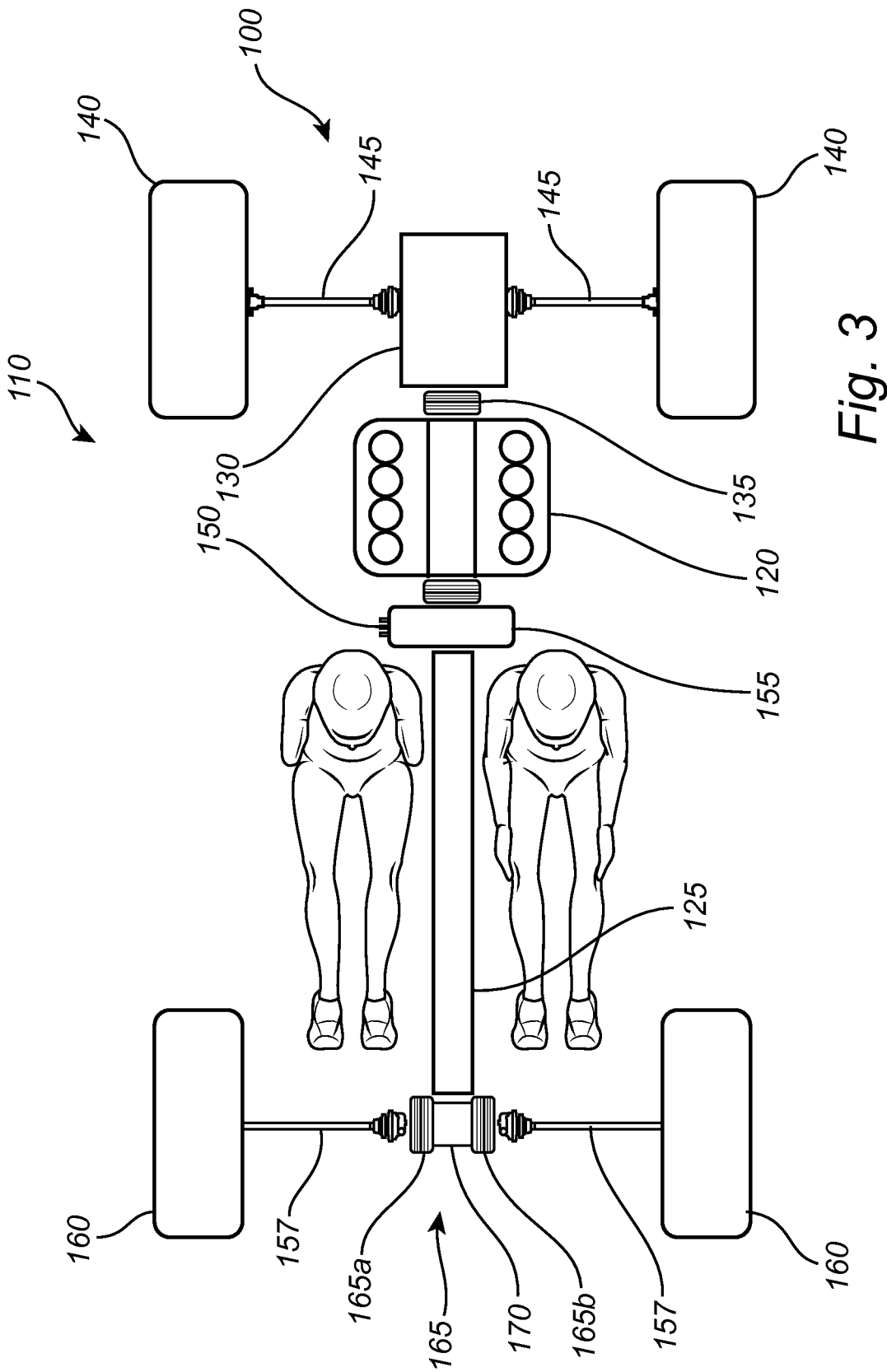
FIG. 3 is a schematic view of a hybrid drivetrain according to a third embodiment of the present invention.

A third embodiment of the invention is shown in FIG. 3. This embodiment is similar to the embodiment shown in FIG. 2, however with the difference that the electric motor 150 and the combustion engine 120 are placed next to one another, wherein the prop-shaft 125 is connecting the electrical motor 125 and the bevel gear 170. It should be noted that the connection clutch 155 is provided between the electrical motor 150 and the combustion engine 120.

Common for the embodiments disclosed above is that the provision of the slip clutch assembly 165 allows for so-called torque vectoring, i.e. the torque provided to each wheel 160 can be altered by allowing either or both slip clutches 165a, 165b to slip to a desired degree, hence reducing the torque provided to the wheel connected to the bevel gear 170 via the corresponding slipping slip clutch 165a, 165b without affecting the torque provided to the wheel 160 connected to the bevel gear 170 by the non-slipping slip clutch 165a, 165b.

It should be noted that the bevel gear 170 and the slip clutch assembly 165 of second drive shaft 157 carrying the wheels 160 can be replaced by a differential of the same type that is described above in connection to the gearbox 130 and a clutch (not shown) providing for selective engagement between the electrical motor 150 and the differential.

In one embodiment of the invention, the maximum rotational speeds of the electric motor 150 and the combustion engine 120 are identical or similar. This is especially beneficial if the hybrid driving system 100 is operated in the two wheel boosted drive mode, since this makes it possible to assist the combustion engine 120 with the electric motor 150 over the combustion engine's speed range.

In still another embodiment, the total gearing of the wheels 160 and the bevel gear 170 is such that the electrical motor 150 reaches its maximum rotational speed at a vehicle speed being significantly lower than the vehicle's top speed. In order not to overrev the electrical motor as the vehicle approaches this lower speed, the clutch assembly 165 is controlled to disengage. Should it be desired to use the power from the electrical motor to propel or accelerate the vehicle, the connection clutch 155 can be engaged, hence allowing the electrical motor 150 to assist the combustion engine 120 driving the wheels 140 of the second drive shaft 145, i.e. two wheel boosted mode according to what is described above.

As can be understood from the above, and as has already been mentioned briefly, the hybrid drivetrain 100 can be controlled by way of a method which comprises the steps of determining a desired driving mode from a plurality of different driving modes listed and controlling energizing, engagement and disengagement of the components of the hybrid drivetrain 100 accordingly. The major components of the hybrid drivetrain 100 are seen in the schematic block diagram of FIG. 4 and include the drive clutch 135, first drive unit 120, connection clutch 155, second drive unit 150 and clutch assembly 165, which are all connected to a communication bus 170. The communication bus 170 may, for instance, be a Controller Area Network (CAN) or Local Interconnect Network (LIN).

The components 135, 120, 155, 150 and 165 of the hybrid drivetrain 100 are controllable by a control arrangement over the communication bus 170. The control arrangement comprises a controller 180 (or a plurality of controllers) which is operatively connected to the second drive unit 150, slip clutch assembly 165, connection clutch 155, drive clutch 135 and first drive unit 120 over the communication bus 170. The controller 180 has an associated memory 190 (or a plurality of memories), which may be internal or external to the controller 180. The controller 180 may, for instance, be a Transmission Control Unit (TCU) or Engine Control Unit (ECU). It may be implemented by one or more microprocessors, digital signal processors, field-programmable gate arrays or other kind of programmable electronic circuitry. The memory 190 may, for instance, be ROM, RAM, SRAM, DRAM, CMOS, FLASH, DDR, EEPROM, flash, hard drive, optical storage or any combination thereof.

Figure 5:
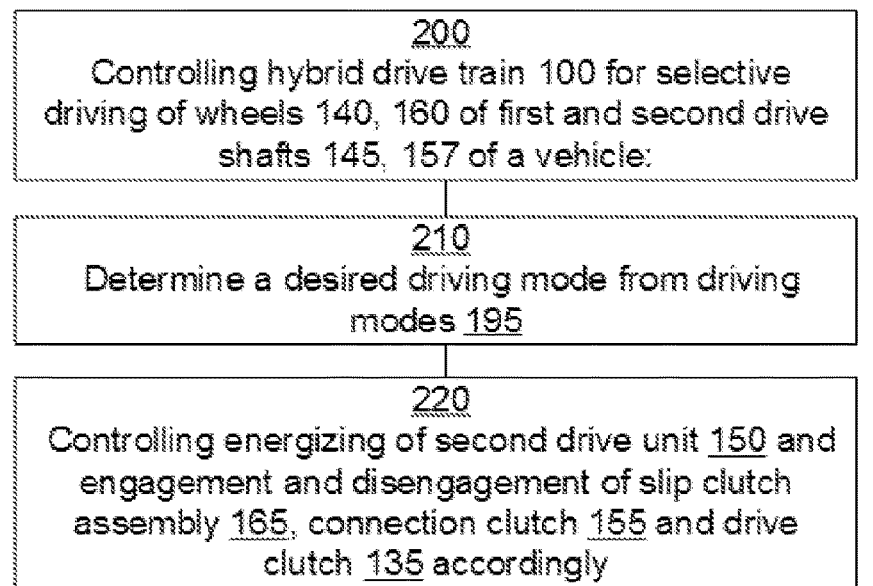
FIG. 5 is a schematic flowchart diagram of a method for controlling a hybrid drivetrain for selective driving of wheels of first and second drive shafts of a vehicle, the method being executable for the hybrid drivetrain setup of FIG. 4.

FIG. 5 is a schematic flowchart diagram of a method 200 for controlling the hybrid drivetrain 100 for selective driving of the wheels 140 and 160 of the first and second drive shafts 145, 157 of the vehicle 110. The method 200 is executable by the control arrangement for the hybrid drivetrain setup of FIG. 4. As can be seen, definitions of a plurality of driving modes 195 are stored in the memory 190 and are listed as a. to g. below. The method 200 involves determining a desired driving mode from the driving modes 195, and controlling energizing of the second drive unit 150 as well as engagement and disengagement of the slip clutch assembly 165, the connection clutch 155 and the drive clutch 135 according to the following:

Driving Modes 195:
  a. Starter mode: Energize the second drive unit 120, engage the connection clutch 155 and disengage the slip clutch assembly 165 and the drive clutch 135.
  b. Four-wheel drive mode: Energize the second drive unit 150, engage slip clutch assembly 165 and drive clutch 135, disengage connection clutch 155.
  c. Two-wheel boosted mode: Energize second drive unit 150, disengage slip clutch assembly 165, engage connection clutch 155 and drive clutch 135. In the disclosed embodiment, the two-wheel boosted mode means boosted rear wheel drive. In alternative embodiments, the two-wheel boosted mode may mean boosted front wheel drive.
  d. Two-wheel electric mode: Energize second drive unit 150, engage slip clutch assembly 165, disengage drive clutch 135 and connection clutch 155.
  e. Two-wheel combustion engine driving mode: Disengage slip clutch assembly 165 and connection clutch 155, engage drive clutch 135.
  f. Battery charging mode: Engage connection clutch 155 and control the second drive unit 150 to function as a generator powered by the first drive unit 120.

g. Regenerative braking mode: Engage slip clutch assembly 165, control the second drive unit 150 to function as a generator and store the electric power produced by the second drive unit 150 in an on-board battery.

In addition to this, the method may further involve performing the specific functionality described for any of the embodiments above.

A further aspect of the invention can be seen as a hybrid drivetrain for selective driving of wheels of first and second drive shafts of a vehicle, said drivetrain comprising first and second drive units, wherein the first drive unit is connected to the first drive shaft and wherein the second drive unit is connected to the second drive shaft. The hybrid drivetrain further comprises a connection clutch allowing for selective connection between the first and second drive units.

In embodiments of this further aspect of the invention, the second drive unit may be directly connected to the second drive shaft without gear shift capabilities. To this end, a total gearing of the wheel size of the wheels of the second drive shaft and the second drive shaft's connection to the second drive unit is such that the second drive unit will reach its maximum rotational speed at a vehicle velocity significantly lower than the vehicle's top speed. Advantageously, a slip clutch assembly is provided for allowing selective connection between the second drive unit and the second drive shaft, wherein the slip clutch assembly is disconnected as the vehicle approaches the speed at which the second drive unit approaches its maximum rotational speed. As mentioned for the previously disclosed embodiments, the slip clutch assembly may advantageously be a dual clutch arrangement comprising two slip clutches located on either side of a bevel gear, wherein the slip clutches are controllable for allowing different rotational speeds of the wheels of the second drive shaft.

The invention claimed is:

1. In a vehicle having a first drive shaft driving first wheels and a second drive shaft driving second wheels, a hybrid drivetrain for selectively driving the first wheels of the first drive shaft and the second wheels of the second drive shaft, the hybrid drivetrain comprising:
  first and second drive units, wherein the first drive unit is connectable to the first drive shaft, and wherein the second drive unit is connectable to the second drive shaft;
  a connection clutch selectively connectable between the first and second drive units; and
  a slip clutch assembly configured for allowing selective connection between the second drive unit and the second drive shaft, the slip clutch assembly comprising first and second slip clutches respectively located on opposite sides of a bevel gear, the first and second slip clutches being controllable so as to allow different rotational speeds of the second wheels driven by the second drive shaft.

2. The hybrid drivetrain of claim 1, further comprising a drive clutch configured for allowing selective connection between the first drive unit and the first drive shaft.

3. The hybrid drivetrain of claim 1, wherein the first drive unit is a combustion engine.

4. The hybrid drivetrain of claim 1, wherein the second drive unit is an electric motor.

5. The hybrid drivetrain of claim 1, wherein the first drive unit is connectable to the first drive shaft by a gearbox.

6. The hybrid drivetrain of claim 1, wherein the second drive unit is directly connectable to the second drive shaft without gear shift capabilities.

7. The hybrid drivetrain of claim 6, wherein the second wheels driven by the second drive shaft have a wheel size such that a total gearing of the wheels of the second drive shaft and the connection of the second drive shaft to the second drive unit provides a maximum rotational speed of the second drive unit that is reached at a vehicle speed lower than a top speed of the vehicle.

8. The hybrid drivetrain of claim 7, wherein the slip clutch assembly between the second drive unit and the second drive shaft is configured to be disconnected as the vehicle approaches a speed at which the second drive unit approaches its maximum rotational speed.

9. A vehicle, comprising:

a first drive shaft driving first wheels and a second drive shaft driving second wheels; and a hybrid drivetrain for selectively driving the first drive shaft and the second drive shaft, the hybrid drivetrain comprising:

first and second drive units, wherein the first drive unit is connectable to the first drive shaft, and wherein the second drive unit is connectable to the second drive shaft;

a connection clutch selectively connectable between the first and second drive units; and a slip clutch assembly configured for allowing selective connection between the second drive unit and the second drive shaft, the slip clutch assembly comprising first and second slip clutches respectively located on opposite sides of a bevel gear, the first and second slip clutches being controllable so as to allow different rotational speeds of the second wheels driven by the second drive shaft.

10. A method for controlling a hybrid drivetrain for selectively driving first wheels through a first drive shaft of a vehicle and second wheels through a second drive shaft of the vehicle, the hybrid drivetrain comprising: a first drive unit connectable to the first drive shaft; a second drive unit connectable to the second drive shaft; a connection clutch configured for selective connection between the first and second drive units; a drive clutch configured for selective connection between the first drive unit and the first drive shaft; and a slip clutch assembly configured for allowing selective connection between the second drive unit and the second drive shaft, the slip clutch assembly comprising first and second slip clutches respectively located on opposite sides of a bevel gear, the first and second slip clutches being controllable so as to allow different rotational speeds of the second wheels, the method comprising:

selecting a driving mode from the group consisting of: (a) a starter mode in which the second drive unit is energized, the connection clutch is engaged, and the slip clutch assembly and the drive clutch are disengaged; (b) a four-wheel drive mode in which the second drive unit is energized, the slip clutch assembly and the drive clutch are engaged, and the connection clutch is disengaged; (c) a two-wheel boosted drive mode, in which the second drive unit is energized, the slip clutch assembly is disengaged, and the connection clutch and the drive clutch are engaged; (d) a two-wheel electric mode, in which the second drive unit is energized, the slip clutch assembly is engaged, and the drive clutch and the connection clutch are disengaged; (e) a two-wheel combustion engine drive mode, in which the slip clutch assembly is disengaged, and the connection clutch and the drive clutch are engaged; (f) a battery charging mode, in which the connection clutch is engaged, and the second drive unit is controlled so as to function as a generator powered by the first drive unit; and (g) a regenerative braking mode, in which the slip clutch assembly is engaged, and the second drive unit is controlled so as to function as a generator and to store electrical power produced by the second drive unit in a battery; and controlling energizing of the second drive unit and engagement and disengagement of the slip clutch assembly, the connection clutch, and the drive clutch according to the selected drive mode.

11. The method of claim 10, wherein the step of controlling is performed by a controller operatively connected to the second drive unit, the slip clutch assembly, the connection clutch and the drive clutch over a communication bus, the controller having non-volatile memory in which definitions of the driving modes are stored.

* * * * *